US009781687B2

United States Patent
Sen et al.

(10) Patent No.: US 9,781,687 B2
(45) Date of Patent: Oct. 3, 2017

(54) CONTROLLING RADIO TRANSMISSION POWER IN A MULTI-RADIO WIRELESS COMMUNICATION DEVICE

(71) Applicant: Apple Inc., Cupertino, CA (US)

(72) Inventors: Indranil Sen, Santa Clara, CA (US); Mohit Narang, Cupertino, CA (US); Digvijay Arjunrao Jadhav, Sunnyvale, CA (US); William S. Burchill, San Jose, CA (US); Vinay R. Majjigi, Sunnyvale, CA (US); Paul V. Flynn, Menlo Park, CA (US); Wen Zhao, San Jose, CA (US); Matthew L. Semersky, San Jose, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 14/282,326

(22) Filed: May 20, 2014

(65) Prior Publication Data

US 2015/0341869 A1    Nov. 26, 2015

(51) Int. Cl.
| | | |
|---|---|---|
| *H04W 52/34* | (2009.01) | |
| *H04W 52/36* | (2009.01) | |
| *H04W 88/06* | (2009.01) | |
| *H04W 88/04* | (2009.01) | |
| *H04W 88/12* | (2009.01) | |
| *H04W 84/04* | (2009.01) | |
| *H04W 84/12* | (2009.01) | |

(52) U.S. Cl.
CPC ......... *H04W 52/34* (2013.01); *H04W 52/346* (2013.01); *H04W 52/367* (2013.01); *H04W 84/042* (2013.01); *H04W 84/12* (2013.01); *H04W 88/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0187784 A1* | 12/2002 | Tigerstedt | ......... | H04W 36/0088 455/439 |
| 2008/0253351 A1* | 10/2008 | Pernu | ................. | H04W 52/367 370/345 |
| 2012/0021707 A1* | 1/2012 | Forrester | ............ | H04W 52/281 455/103 |
| 2012/0021800 A1* | 1/2012 | Wilson | ............... | H04W 52/146 455/550.1 |
| 2012/0270592 A1* | 10/2012 | Ngai | ................... | H04W 52/226 455/522 |
| 2013/0065525 A1* | 3/2013 | Kiukkonen | ........... | H04W 52/36 455/41.2 |

* cited by examiner

*Primary Examiner* — Ankur Jain
*Assistant Examiner* — Zhitong Chen
(74) *Attorney, Agent, or Firm* — Downey Brand LLP

(57) ABSTRACT

A method for controlling transmission power in accordance with a total transmission power limit in a multi-radio wireless communication device including a master radio and a slave radio is provided. The method can include the wireless communication device determining, at the master radio, a transmission power of the master radio. The method can further include the wireless communication device providing information indicative of the transmission power of the master radio from the master radio to the slave radio. The method can additionally include determining, at the slave radio, an allowable transmission power for the slave radio. A sum of the allowable transmission power and the transmission power of the master radio may not exceed the total transmission power limit.

20 Claims, 11 Drawing Sheets

CONTROLLING RADIO TRANSMISSION POWER IN A MULTI-RADIO WIRELESS COMMUNICATION DEVICE

FIELD

The described embodiments relate generally to wireless communications technology. More particularly, the present embodiments relate to controlling radio transmission power in a multi-radio wireless communication device in accordance with a total transmission power limit.

BACKGROUND

Many modern wireless communication devices include multiple radios. These multiple radios may be used by the device to concurrently communicate via multiple wireless communication technologies. For example, many wireless communication devices include both a cellular radio for supporting communication over a cellular network and a wireless local area network (WLAN) radio, such as a Wi-Fi radio, for supporting communication over a WLAN. Such devices can accordingly communicate concurrently over both a cellular network and a WLAN. In many instances a device supporting concurrent connections to a cellular network and a WLAN can emit simultaneous transmissions via both the cellular radio and the WLAN radio.

Wireless communication devices are often subject to regulations limiting radio frequency (RF) emissions that are issued by government and other regulatory bodies, such as the Federal Communications Commission (FCC). For example, Specific Absorption Rate (SAR) restrictions, such as those issued by the FCC, place limits on the transmission power of wireless communication devices to limit the amount of RF energy radiated when the devices are in proximity to a human body (i.e., a device user). In this regard, SAR can be defined in terms of a measure of the rate at which energy is absorbed by the human body when exposed to an RF electromagnetic field. As such, SAR limits can be imposed that limit the total transmission power of a wireless communication device so as to limit RF absorption by a user of the device.

When multiple radios are transmitting concurrently in a multi-radio wireless communication device, the imposition of SAR restrictions and/or other regulations restricting total transmission power impose a requirement to jointly limit the transmission power of the concurrently transmitting radios. Present wireless communication devices generally apply a conservative approach that assumes a maximum transmission power for a higher transmission power radio, such as a cellular radio, and then decides a safe transmission power level for a lower transmission power radio, such as a WLAN radio (i.e., any remaining transmission power within the total transmission power limit after subtracting the maximum cellular transmission power from the total transmission power limit). As a cellular radio does not always transmit at its maximum possible transmission power, the WLAN radio is often penalized by transmitting at an overly conservative transmission power.

SUMMARY

Some example embodiments provide methods, apparatuses, and computer program products implementing improved techniques for controlling radio transmission power in a multi-radio wireless communication device including at least a first radio and a second radio in accordance with a total transmission power limit. More particularly, some example embodiments provide for adaptive transmission power selection in the second radio, referred to as a slave radio, based on an actual transmission power characteristic of a transmission in the first radio, referred to as a master radio. In this regard, the master radio can select its transmission power and can then provide information indicative of the transmission power (e.g., a prior transmission power and/or a predicted future transmission power) to the slave radio, which can then determine an allowable transmission power within the confines of a total transmission power limit based at least in part on the transmission power of the master radio. Accordingly, rather than always assuming a maximum transmission power of a first radio (e.g., a cellular radio), as in prior wireless communication devices, wireless communication devices in accordance with various example embodiments can dynamically select a transmission power for a second radio (e.g., a WLAN radio) in concurrent transmission scenarios based on an actual transmission power of the first radio. In many circumstances, this dynamic transmission power selection by the second radio can yield a higher transmission power for the second radio and improve second radio performance compared to prior wireless communication devices.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
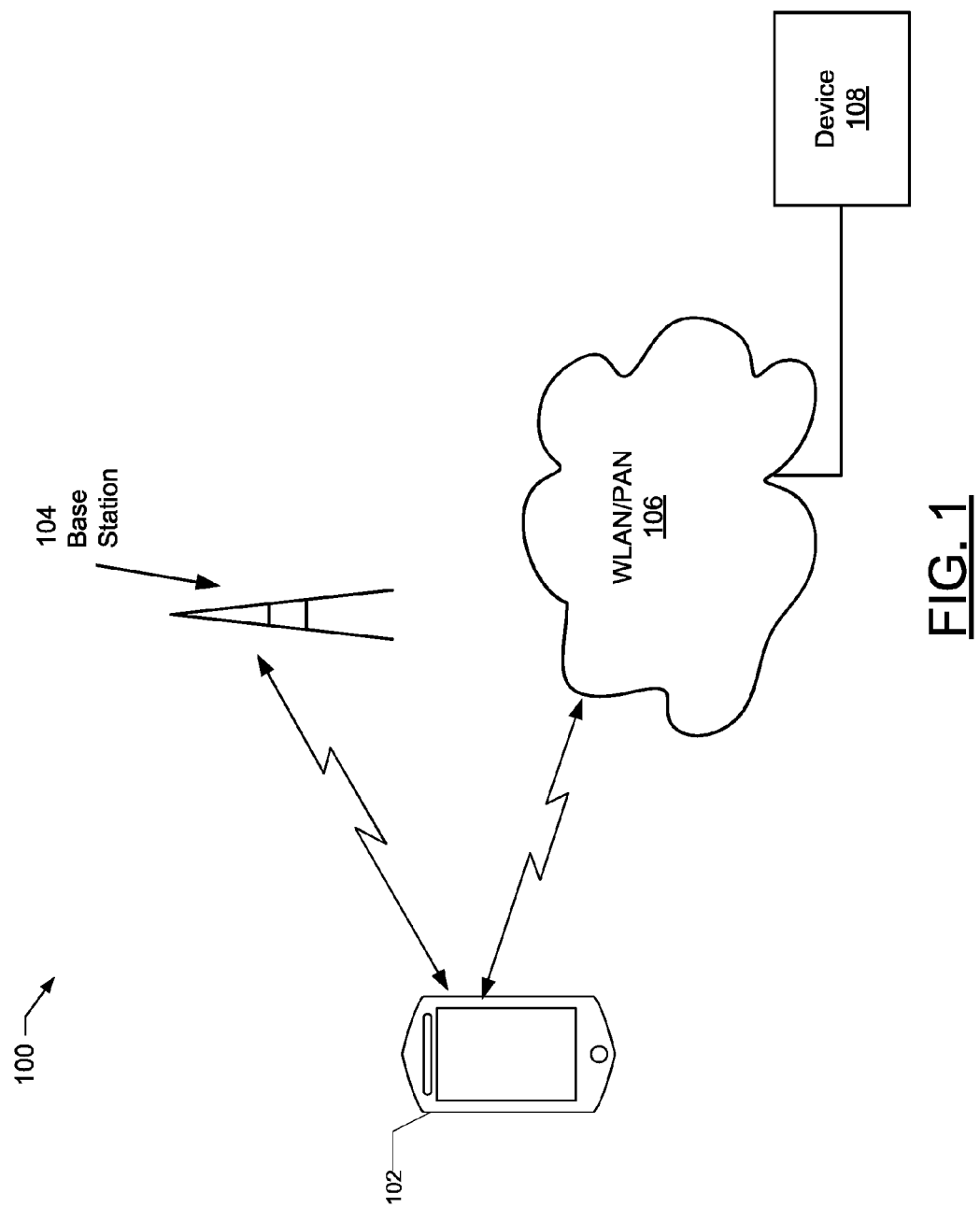
FIG. 1 illustrates an example system in which some example embodiments can be applied.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

When multiple radios are transmitting concurrently in a multi-radio wireless communication device subject to SAR restrictions and/or other regulation restricting total transmission power, the transmission power of the concurrently transmitting radios must be jointly limited such that the total sum of the transmission power of the radios complies with the total transmission power limit imposed by the regulation. Present wireless communication devices generally apply a conservative approach that assumes a maximum transmission power for a first radio, such as a cellular radio, and then decides a safe transmission power level for a second radio, such as a WLAN radio (i.e., any remaining transmission power within the total transmission power limit after subtracting the maximum cellular transmission power from the total transmission power limit).

For example, given a maximum cellular radio transmission power of 23 dBm and a maximum WLAN radio transmission power of 18 dBm with an example 23.63 dBm SAR limit, prior art WLAN radios can always back off their transmission power to 15 dBm when transmitting concurrently with a cellular radio even when the cellular radio is not transmitting at its full 23 dBm capability. As a cellular radio frequently does not transmit at its maximum possible transmission power, the WLAN radio is often penalized by transmitting at an overly conservative transmission power. Moreover, the overly conservative WLAN back off applied by present wireless communication devices during concurrent transmission with a cellular radio can reduce an effective range of the WLAN radio, thus reducing radio performance. Moreover, due to the reduced radio performance, WLAN data throughput can be reduced as the lower radio link performance can result in an increase in dropped packets on the WLAN.

Some example embodiments provide methods, apparatuses, and computer program products implementing improved techniques for controlling radio transmission power in a multi-radio wireless communication device including at least a first radio and a second radio in accordance with a total transmission power limit. More particularly, some example embodiments provide for adaptive transmission power selection in the second radio, referred to as a slave radio, based on an actual transmission power characteristic of a transmission in the first radio, referred to as a master radio. In this regard, the master radio can select its transmission power and can then provide information indicative of the transmission power (e.g., a prior transmission power and/or a predicted future transmission power) to the slave radio, which can then determine an allowable transmission power within the confines of a total transmission power limit based at least in part on the transmission power of the master radio. Accordingly, rather than always assuming a maximum transmission power of a first radio, such as a cellular radio, as in prior wireless communication devices, wireless communication devices in accordance with various example embodiments can dynamically select a transmission power for a second radio, such as a WLAN radio, in concurrent transmission scenarios based on an actual transmission power of the first radio. In many circumstances, this dynamic transmission power selection by the second radio can yield a higher transmission power for the second radio and improve second radio performance through an increased effective transmission range and increased data throughput compared to prior wireless communication devices.

FIG. 1 illustrates an example system 100 in which some example embodiments can be applied. The system 100 can include a wireless communication device 102, which can, for example, be embodied as a cellular phone, such as various mobile communication devices, such as a smart phone device, a tablet computing device, a smart watch or other wearable computing device, and/or the like; a personal computing device, such as a laptop computing device; a cellular hotspot device; and/or other computing device that can be subject to a restriction on total transmission power and that can include multiple radios that may transit concurrently.

The wireless communication device 102 can include a cellular radio, and can be configured to engage in cellular communications, which can be supported by a base station 104. The base station 104 can be any type of cellular base station dependent on a type of radio access technology (RAT) supported by the base station 104. By way of non-limiting example, the base station 104 can be a base station (BS), base transceiver station (BTS), node B, evolved Node B (eNB), some combination thereof, and/or other type of cellular base station.

The cellular radio of the wireless communication device 102 can be configured to support communication via any cellular RAT that can be supported by both the wireless communication device 102 and the base station 104. In some example embodiments, the wireless communication device 102 can be a multi-mode device capable of supporting multiple cellular RATs. By way of non-limiting example, the wireless communication device 102 and base station 104 can use a Long Term Evolution (LTE) RAT, such as various releases of the LTE standard specified by the Third Generation Partnership Project (3GPP), including various releases of LTE, LTE-Advanced (LTE-A), and/or other present or future releases using LTE technology. As another example, the wireless communication device 102 and base station 104 can communicate via a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1 xRTT; and/or the like. As another example, the wireless communication device 102 and base station 104 can communicate via a second generation (2G) cellular RAT, such as a Global System for Mobile Communications (GSM) RAT. It will be appreciated that the foregoing RATs are provided by way of example, and not by way of limitation. In this regard, the wireless communication device 102 and base station 104 can be configured to communicate via any present or future developed cellular RAT, including, for example, various fifth generation (5G) RATs now in development.

The wireless communication device 102 can further include a radio(s) configured to support communication over a WLAN and/or a personal area network (PAN), such as the WLAN/PAN 106. The WLAN/PAN 106 can comprise any type of WLAN and/or PAN, such as, by way of non-limiting example, a WLAN implementing Wi-Fi or other Institute of Electrical and Electronics Engineers (IEEE) 802.11 technology (e.g., 802.11 a/b/g/n/ac/ad/af/ah/aj/ax and/or other present or future developed 802.11 technology); a WLAN implementing a Z-wave technology, a PAN implementing an IEEE 802.15 technology, such as Bluetooth, Zigbee, an/or the like; and/or other present or future developed WLAN and/or PAN technology. As such, the wireless communication device 102 can include one or more WLAN radios, such as one or more WLAN radios configured to communicate via an IEEE 802.11 technology; a Bluetooth radio, a Zigbee radio, some combination thereof, and/or other radio(s) that may be configured to support a WLAN and/or PAN communication technology. The WLAN/PAN 106 and supporting radio(s) of the wireless communication device 102 can, for example, use an unlicensed band(s), such as an Industrial, Scientific, and Medical (ISM) band(s).

The wireless communication device 102 can engage in wireless communications with a device 108 via the WLAN/PAN 106. For example, in some embodiments in which the WLAN/PAN 106 is a structured WLAN, the device 108 can comprise a wireless router and/or other access point for the WLAN. As a further example, in embodiments in which the WLAN/PAN 106 comprises a Bluetooth network, the device 108 can be a Bluetooth headset or other Bluetooth device that can be interfaced with a wireless communication device.

While the wireless communication device 102 has been described and illustrated as having a combination of a cellular radio and one or more WLAN and/or PAN radios, it will be appreciated that the illustration of FIG. 1 and attendant description is provided solely by way of example to illustrate an example context in which various embodiments can be applied. In this regard, the wireless communication device 102 can include any combination of two or more radios, including, for example, multiple cellular radios (e.g., a first cellular radio supporting a first cellular RAT and a second cellular radio supporting a second cellular RAT), multiple WLAN radios (e.g., a first WLAN radio supporting communication in a first band and a second WLAN radio supporting communication in a second band), and/or other combination of radios that can transmit concurrently.

The wireless communication device 102 of some example embodiments can be subject to a regulation(s) restricting total transmission power by the wireless communication device 102, such as when the wireless communication device is within proximity of a human body. By way of non-limiting example, the wireless communication device 202 can be subject to SAR regulations, such as can be issued by the United States Federal Communications Commission (FCC), The European Committee for Electrotechnical Standardization (CENELEC), and/or other government or other regulatory body that can regulate radio frequency emissions by a wireless communication device when the device is within proximity of a human. In embodiments in which the wireless communication device 102 can be subject to a SAR and/or other transmission power regulation when within proximity of a human body, the wireless communication device 102 can include a proximity sensor, such as proximity sensor 223 illustrated in and discussed below with respect to FIG. 2, which can be configured to detect when the wireless communication device 102 is within proximity of a human body, such as if the wireless communication device 102 is held close to a user's head to enable the user to talk into the device and participate in a voice call.

When the wireless communication device 102 is concurrently transmitting via multiple radios, such as if the wireless communication device 102 is sending a cellular transmission to the base station 104 via a cellular radio while sending a transmission to the device 108 via a WLAN/PAN radio, while subject to a regulation limiting the device's total transmission power, the transmission power of the concurrently transmitting radios can be jointly limited such that the total sum of the transmission power of the radios complies with the total transmission power limit imposed by the regulation.

In accordance with some example embodiments, a first radio of the wireless communication device 102, such as by way of non-limiting example, the cellular radio, can be designated as a master radio. A second radio, such as by way of non-limiting example, a WLAN and/or PAN radio, can be designated as a slave radio. The master radio determine its transmission power and can then provide information indicative of the transmission power of the master radio to the slave radio. The slave radio can then determine its allowable transmission power in accordance with the total transmission power limit. In this regard, the allowable transmission power of the slave radio can be determined in accordance with various embodiments such that a sum of the allowable transmission power of the slave radio and the indicated transmission power of the master radio does not exceed the total transmission power limit. Thus, for example, in the example system 100, the cellular radio of the wireless communication device 102 can indicate an actual (e.g., an actual observed and/or predicted future) transmission power used for a transmission to the base station 104 to the WLAN/PAN radio supporting the connection to the WLAN/PAN 106. The WLAN/PAN radio can then determine its allowable transmission power for transmissions to the WLAN/PAN 106 based on the total transmission power limit and the indicated transmission power of the cellular radio.

Figure 2:
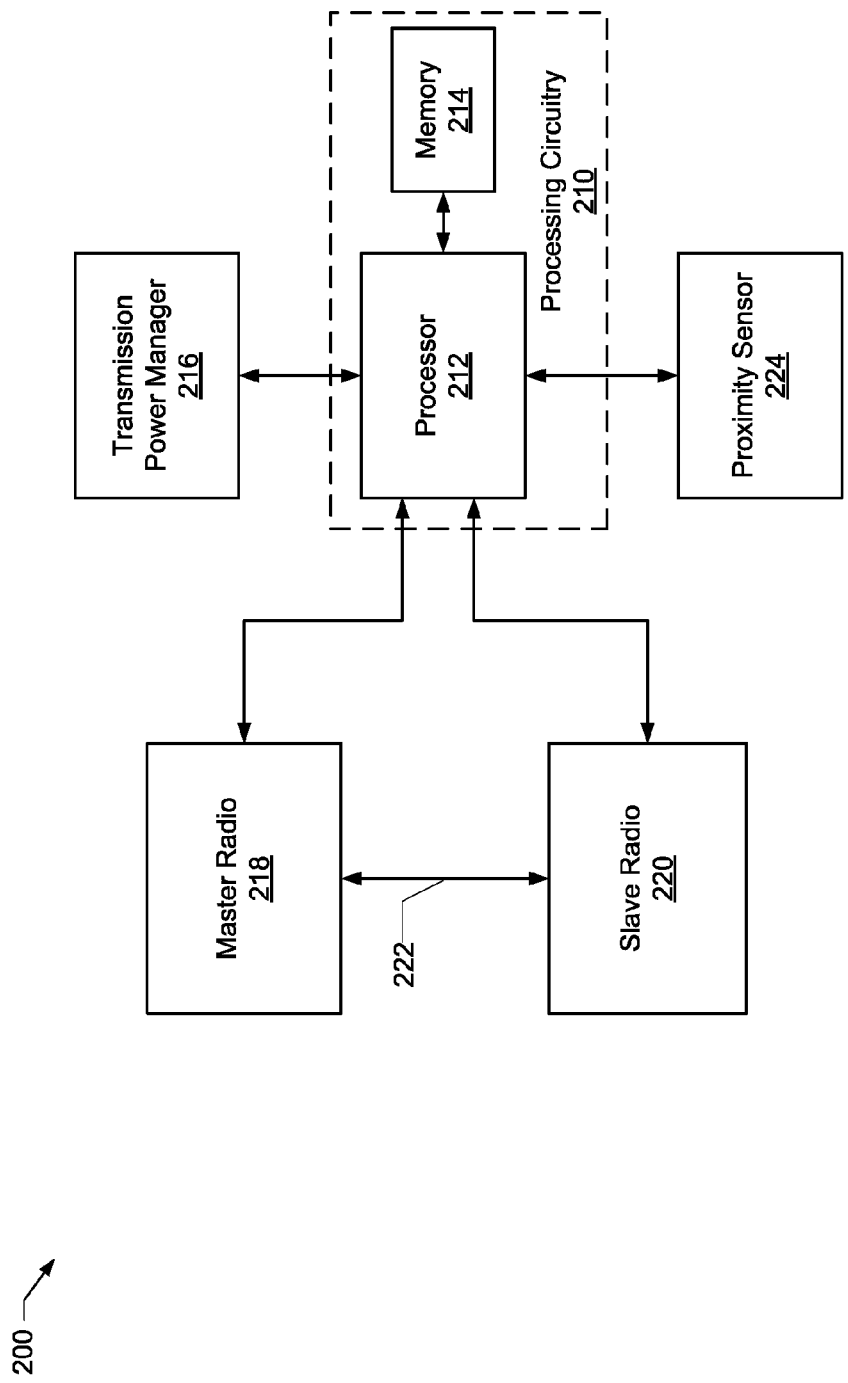
FIG. 2 illustrates a block diagram of an apparatus that can be implemented on a wireless communication device in accordance with some example embodiments.

FIG. 2 illustrates a block diagram of an apparatus 200 that can be implemented on a wireless communication device, such as wireless communication device 102, in accordance with some example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of a wireless communication device, such as wireless communication device 102, in accordance with various example embodiments, and thus can provide means for performing functionalities of the wireless communication device in accordance with various example embodiments. The processing circuitry 210 can be configured to perform data processing, application execution and/or other processing and management services according to one or more example embodiments. In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a single chip or chipset.

In some example embodiments, the processing circuitry 210 can include a processor 212 and, in some embodiments, such as that illustrated in FIG. 2, can further include memory 214. The processing circuitry 210 can be in communication with or otherwise control a transmission power manager 216 and two or more radios that can be implemented on the apparatus 200, including a master radio 218 and slave radio 220. In some example embodiments, the apparatus 200 can further include a proximity sensor 224, which can also be in communication with or otherwise controlled by the processing circuitry 210.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor 212 of some example embodiments can comprise a host processor configured to serve as a host for controlling or otherwise facilitating operation of two or more device radios, such as the master radio 218 and slave radio 220. In some example embodiments, the processor 212 can comprise an application processor, which can be configured to support execution of various applications that can be implemented on a wireless communication device. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transmission power manager 216, master radio 218, slave radio 220, or proximity sensor 224 via one or more buses for passing information among components of the apparatus 200.

The apparatus 200 can further include transmission power manager 216, which can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the transmission power manager 216. The transmission power manager 216 can be configured to control and/or otherwise support the control of the transmission power of a radio, such as the master radio 218 and slave radio 220, on a multi-radio wireless communication device in accordance with an applicable total transmission power limit in accordance with various example embodiments.

The apparatus 200 can include a plurality of co-located radios. Two such radios—the master radio 218 and slave radio 220—are illustrated by way of example in FIG. 2. It will be appreciated, however, that the apparatus 200, and thus, the wireless communication device 102 and/or other wireless communication device implementing the apparatus 200, can include one or more further radios in some example embodiments.

The radios implemented on the apparatus 200 can each implement any respective wireless communication technology. For example, in some example embodiments, one or more radios on the apparatus 200, such as one or more of the master radio 218 or slave radio 220, can implement a cellular communication technology, such as a Long Term Evolution (LTE) cellular communication technology, a Universal Mobile Telecommunications System (UMTS) cellular communication technology, a Global System for Mobile Communications (GSM) cellular communication technology, a Code Division Multiple Access (CDMA) cellular communication technology, or a CDMA 2000 cellular communication technology, and/or the like. As a further example, in some example embodiments, one or more radios on the apparatus 200, such as one or more of the master radio 218 or slave radio 220, can be a connectivity radio, such as Bluetooth, Zigbee, or other wireless PAN radio; a Wi-Fi or other wireless local area network (WLAN) radio; or other connectivity radio. As still a further example, the apparatus 200 of some example embodiments can include a global navigation satellite system (GNSS) radio, such as a Global Positioning System (GPS) radio, Russian GLONASS system radio, Doppler Orbitography and Radio-positioning Integrated by Satellite (DORIS) radio, Chinese Compass system radio, Galileo positioning system radio, and/or other GNSS radio. It will be appreciated, however, that the foregoing example radio technologies are provided by way of example, and not by way of limitation, as various example embodiments support in-device coexistence between any two (or more) radios that use disparate wireless communication technologies.

It will be appreciated that the master radio 218 and slave radio 220 support any combination of RATs. For example, in some embodiments both the master radio 218 and slave radio 220 can each support communication via the same RAT, such as a WLAN technology, but can operate in different frequency bands (e.g., a 2.4 GHz radio and a 5 GHz radio). As another example, in some embodiments, one of the master radio 218 and slave radio 220 can support communication via a first RAT, such as a cellular RAT, and the other of the master radio 218 and slave radio 220 can support communication via a second RAT, such as an IEEE 802.11 and/or other WLAN technology.

Each radio, including the master radio 218 and slave radio 220, implemented on the apparatus 200 can include appropriate circuitry for supporting radio frequency communication via a RAT supported by the radio. For example, each radio implemented on the apparatus 200 can include one or more transceivers. In some example embodiments, a radio, such as master radio 218 and/or slave radio 220 can be implemented on a chipset, which when implemented on a computing device, such as wireless communication device 102, can be configured to enable the computing device to support wireless communication via one or more RATs. In some such example embodiments, at least a portion of processing circuitry 210 and/or transmission power manager 216 can be implemented on the chipset to support transmission power control in accordance with various example embodiments.

An interface 222 can be used to interface (e.g., communicatively couple) two or more radios, such as the master radio 218 and slave radio 220, on the apparatus 200. The interface 22 can be separate from an interface(s) that may be used to interface the master radio 218 and slave radio 220 with a host application processor, such as can be provided by the processor 212. The interface 222 can be a higher speed interface than the interface(s) between the radios and processor 212, which can offer low latency to allow (e.g., on the order of microseconds) for communication of real time state information between radios. For example, the interface 222 can be a real time, or near-real time interface. The interface 222 of some example embodiments can be an interface dedicated to the exchange of information between radios, which may not be used for communication of information to or from non-radio components of the apparatus 200. In some example embodiments, the interface 222 can be a direct interface linking the master radio 218 and slave radio 220 (and potentially one or more further radios). In some example embodiments, the interface 222 can comprise a coexistence interface, such as a Wireless Coexistence Interface (WCI) (e.g., a WCI-2 interface, WCI-1 interface, or other type of WCI), that can be configured to support exchange of state information usable to support in-device coexistence. It will be appreciated, however, that WCI interface types are provided as one non-limiting example of an interface that can be used to facilitate communication of state information between radios, and any appropriate interface that can be used to interface two or more radios to support the exchange of state information between radios can be used in addition to or in lieu of an WCI interface to provide the interface 222 in accordance with some example embodiments. As described further herein below, the interface 222 can be used by the master radio 218 of some example embodiments to provide information indicative of the transmission power of the master radio 218 so as to enable the slave radio 220 to determine its allowable transmission power.

The apparatus 200 can further include proximity sensor 224. The proximity sensor 224 can be configured to sense proximity between a wireless communication device, such as wireless communication device 102, and another object, such as a human body. For example, in some embodiments, the proximity sensor 224 can be configured to sense when the wireless communication device 202 is positioned within sufficient proximity of a human body to trigger a restriction on total transmission power (e.g., in compliance with a SAR regulation and/or other regulation that can apply to a wireless communication device). The proximity sensor 224 of such example embodiments can be configured provide output indicating that the wireless communication device is within proximity to a human body when proximity to the human body is detected. As such, the transmission power manager 216, master radio 218, and slave radio 220 of some example embodiments can be configured to selectively implement techniques for controlling the total transmission power of the radio based on whether the proximity sensor 224 detects that the wireless communication device is sufficiently proximate to a human body to trigger implementation of a restriction limiting the total transmission power. The proximity sensor 224 can be in communication with one or more of processing circuitry 210, processor 212, memory 214, transmission power manager 216, master radio 218, or slave radio 220 via one or more buses for passing information among components of the apparatus 200.

As described further herein, in various embodiments, the master radio 218 can determine its transmission power (e.g., within total transmission power limits) without regard to the transmission power of the slave radio 220. In this regard, the master radio 218 can have priority over the slave radio 220 in choosing its transmission power. The master radio 218 can provide information indicative of its transmission power (e.g., an actual prior/current transmission power and/or a predicted future transmission power) to the slave radio 220, such as via interface 222. The slave radio 220 can determine an allowable transmission power based at least in part on the information. In this regard, the slave radio 220 can determine an allowable transmission power such that a sum of the allowable transmission power and the transmission power of the master radio does not exceed the applicable total transmission power limit. For example, the allowable transmission power of the slave radio 220 can be defined as: Allowable Slave Tx Power=Total Transmission Power Limit−Transmission Power of Master Radio.

In some example embodiments the slave radio 220 can further factor, a buffer, $\Delta$, which can function as a safety margin reduce the chance of exceeding the total transmission power limit. In some such example embodiments, the slave radio 220 can calculate its allowable transmission power as: Allowable Slave Tx Power=Total Transmission Power Limit−Transmission Power of Master Radio−$\Delta$.

In some example embodiments, the total transmission power limit can be a static transmission power limit that can be applied regardless of the operating scenario. Alternatively, in some example embodiments, the total transmission power limit can be dynamically determined by the transmission power manager 216 based at least in part on observed operating conditions. For example, the total transmission power limit can be determined based at least in part on factors such as a frequency band being used for transmission by a radio, a frequency or frequencies within a band being used for transmission by a radio, a RAT(s) used by the radios, device antenna configurations (e.g., placement of antennas within the device, an antenna being used for transmission when multiple antennas are available, and/or other antenna configuration qualities), a proxy state, a multiple-input and multiple-output (MIMO) mode being used by a radio (if applicable), and/or other factors. In this regard, any factor that can affect the amount and/or rate of RF absorption by a device user at a given transmission power can be considered when determining the total transmission power limit in embodiments in which the total transmission power limit can be dynamically determined. In some embodiments, the transmission power manager 216 and/or one or both of the master radio 218 and slave radio 220 can be configured to access a table or other data structure that defines applicable total transmission power limits for various conditions. Accordingly, the data structure can be used to determine the applicable total transmission power limit given an observed operating condition(s).

A person having ordinary skill in the art will understand that the components of the apparatus 200 can be implemented via any of a variety of architectures. As such, it will be appreciated that, in some example embodiments, the components of the apparatus 200 can be arranged and/or distributed across multiple chips (e.g., multiple dies, integrated circuits, and/or the like). In some such embodiments, aspects of one or more component's of the apparatus 200, such as processing circuitry 210 and/or transmission power manager 216, can be distributed across the multiple chips. An example architecture implementing multiple chips is illustrated in and described below with respect to FIG. 3. Alternatively, in some example embodiments, each component of the apparatus 200, or at least those components implemented in a given embodiment, can be implemented on a single chip (e.g., a single die, integrated circuit, and/or the like), such as a system on a chip. An example architecture implementing each component on a single chip is illustrated in and described below with respect to FIG. 4.

Figure 3:
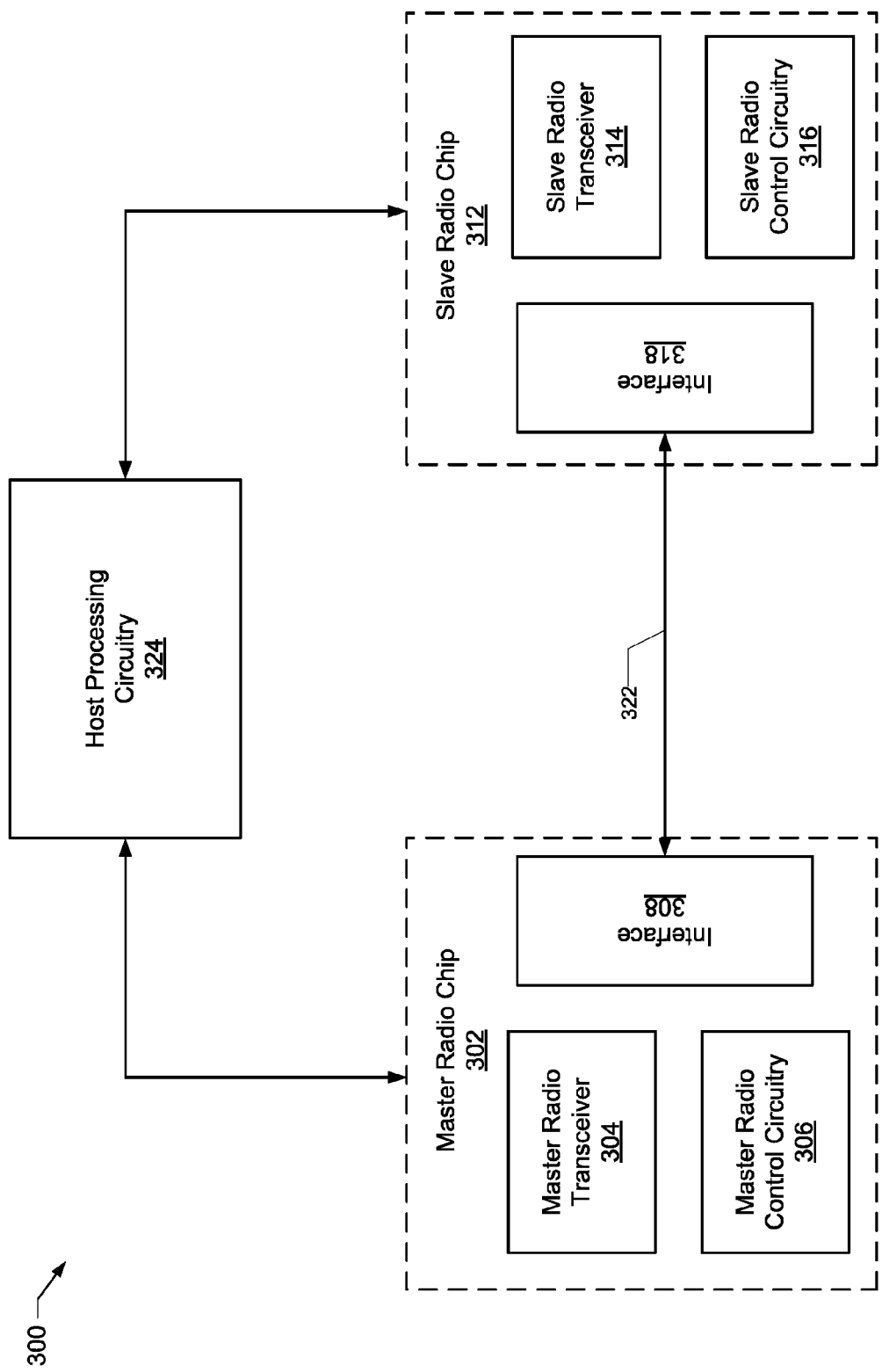
FIG. 3 illustrates an example chip architecture of a wireless communication device including multiple radios in accordance with some example embodiments.

FIG. 3 illustrates an example chip architecture 300 of a wireless communication device, such as wireless communication device 102, including multiple radios in accordance with some example embodiments in which the radios can be implemented on separate chips that can be interfaced with a host processor. The architecture 300 can include a master radio chip 302 and a slave radio chip 312, which can comprise embodiments of the master radio 218 and slave radio 220, respectively. It will be appreciated, however, that the architecture 300 can be extended to include further radio chips.

The master radio chip 302 can include appropriate circuitry for supporting communication via a RAT(s) supported by the master radio chip 302. For example, the master radio chip 302 can include a master radio transceiver(s) 304 that can be configured to send and receive wireless signals in accordance with a RAT(s) supported by the master radio chip 302. The master radio chip 302 can further include master radio control circuitry 306 that can be configured to implement at least some on-chip functionality for controlling the master radio chip 302. In some example embodiments, the master radio control circuitry 306 can comprise a portion of processing circuitry 210, and can be configured to perform at least some functionality of the transmission power manager 216. The master radio control circuitry 306 can, for example, be configured to determine a transmission power (e.g., an actual and/or a predicted future transmission power) of the master radio transceiver 304, and can provide information indicative of the transmission power to the slave radio chip 312 to enable the slave radio chip 312 to determine its allowable transmission power in accordance with various example embodiments. The master radio chip 302 can further include interface component 308, which can be configured to support connection to a further radio chip, such as slave radio chip 312, via an interface, such as interface 322 described below.

The slave radio chip 312 can include appropriate circuitry for supporting communication via a RAT(s) supported by the slave radio chip 312. For example, the slave radio chip 312 can include a slave radio transceiver(s) 314 that can be configured to send and receive wireless signals in accordance with a RAT. The slave radio chip 312 can further include slave radio control circuitry 316 that can be configured to implement at least some on-chip functionality for controlling the slave radio chip 312. In some example embodiments, the slave radio control circuitry 316 can comprise a portion of processing circuitry 210, and can be configured to perform at least some functionality of the transmission power manager 216. For example, the slave radio control circuitry 316 can be configured to receive information that can be provided by the master radio chip 302 regarding a transmission power of the master radio chip 302, and can be configured to use the information to determine an allowable transmission power for the slave radio transceiver 314 in accordance with various example embodiments. The slave radio control circuitry 316 can be further configured to regulate the transmission power of the slave radio transceiver 314 in accordance with the allowable transmission power. The slave radio chip 312 can further include interface component 318, which can be configured to support connection to a further radio chip, such as master radio chip 302, via an interface, such as interface 322.

The interface 322 can be any interface that can be used to support communication between radios on a wireless communication device. The interface 322 can, for example, be an interface offering low latency to allow (e.g., on the order of microseconds) for communication of real time state information between radios. For example, the interface 322 can be a real time, or near-real time interface. The interface 322 of some example embodiments can be an interface dedicated to the exchange of information between radios, which may not be used for communication of information to or from non-radio components of the architecture 300. In some example embodiments, the interface 322 can be an embodiment of the interface 222.

The architecture 300 can further include host processing circuitry 324, which can be interfaced with each of the master radio chip 302 and the slave radio chip 312. In some example embodiments, the host processing circuitry 324 can be interfaced with the master radio chip 302 and slave radio chip 312 via an interface(s) that is separate from the interface 322 used to convey information between the radio chips 302 and 312. The host processing circuitry 324 can, for example, comprise an application or system processor that can be configured to execute and perform applications and/or other system level functionalities of a wireless communization device, such as wireless communication device 102. In some example embodiments, host processing circuitry 324 can comprise a portion of processing circuitry 210, and can be configured to perform at least some functionality of the transmission power manager 216.

Figure 4:
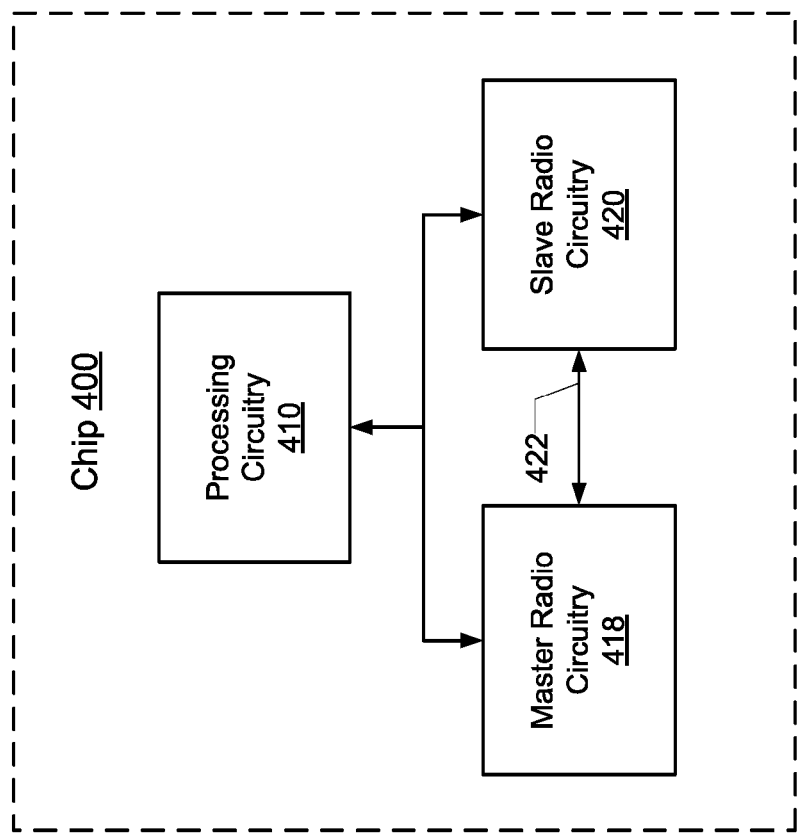
FIG. 4 illustrates another example chip architecture of a wireless communication device including multiple radios in accordance with some example embodiments.

FIG. 4 illustrates another example chip architecture of a wireless communication device, such as wireless communication device 102, including multiple radios in accordance with some example embodiments. More particularly, the architecture illustrated in FIG. 4 is an example architecture in which multiple radios and host processing circuitry can be implemented on a single chip 400 as a system on a chip. The chip 400 can accordingly include circuitry for each radio implemented on the chip 400, including master radio circuitry 418 and slave radio circuitry 420, which can comprise embodiments of the master radio 218 and slave radio 220, respectively. The master radio circuitry 418 and slave radio circuitry 420 can be interfaced via the interface 422, which can, for example, comprise an embodiment of the interface 222. The master radio circuitry 418 and slave radio circuitry 420 can be further interfaced with processing circuitry 410, which can, for example, comprise an embodiment of processing circuitry 210, or portion thereof. Aspects of the transmission power manager 216 can be distributed among the processing circuitry 410, master radio circuitry 418, and slave radio circuitry 420.

It will be appreciated that the example architectures illustrated in FIGS. 3 and 4 are provided by way of example, and not by way of limitation. In this regard, a person having ordinary skill in the art will realize that other architectures are contemplated within the scope of the disclosure. For example, in some embodiments, the master radio 218 and slave radio 220 can be implemented on a first chip, which can be interfaced with a second chip that can include a host or application processor.

In some example embodiments, a first radio implemented on a wireless communication device can be permanently configured as the master radio 218, and a second radio can be permanently configured as the slave radio. The configuration of such permanent master and slave radio slave designations can, for example, be defined based on a the RATs implemented by the respective radios and/or general transmission powers associated therewith, respective radio priorities in terms of desired quality of service, and/or other factors. For example, in some embodiments, a cellular radio can be defined as a permanent master radio and a lower powered connectivity radio(s), such as a WLAN radio, PAN radio, and/or the like, can be defined as the slave radio(s). In some such embodiments, a PAN radio, such as a Bluetooth radio can function as a slave radio to a WLAN radio and/or as a second slave radio to a cellular radio in a device including a cellular radio, WLAN radio, and a Bluetooth or other PAN radio.

In some example embodiments, the roles of master and slave radio can be dynamically assigned and can be switched in operation. In some such example embodiments, the transmission power manager 216 can be configured to assign master and slave roles and to provide the master/slave designations to the device radios. For example, if a higher priority application is using and/or a high priority task is being performed via a WLAN connection, the transmission power manager 216 can at least temporarily assign a WLAN radio a master radio designation with the cellular radio being at least temporarily assigned a slave radio designation. Additionally or alternatively, in some example embodiments, a first radio that typically operates as a slave radio can signal a second radio that typically operates as a master radio (e.g., via interface 222) that the first radio is performing and/or about to perform a high priority transmission and that the second radio should function as the slave radio and adjust its transmission power to accommodate the desired transmission power of the first radio during the transmission. For example, in some such embodiments, a WLAN radio can signal a cellular radio that the WLAN radio is going to operate as a master radio when performing a WiFi association procedure for associating with a WLAN.

Figure 5:
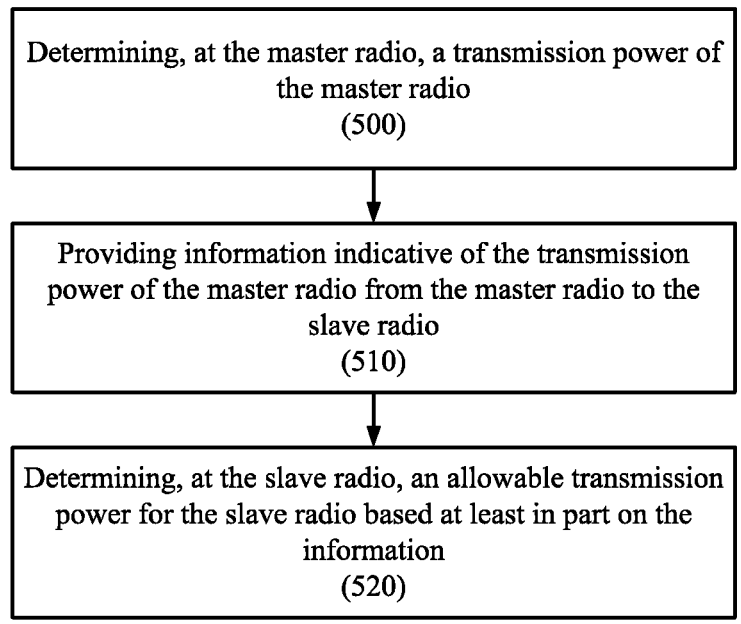
FIG. 5 illustrates a flowchart according to an example method for controlling radio transmission power in a multi-radio wireless communication device in accordance with a total transmission power limit in accordance with some example embodiments.

FIG. 5 illustrates a flowchart according to an example method for controlling radio transmission power in a multi-radio wireless communication device, such as wireless communication device 102, in accordance with a total transmission power limit in accordance with some example embodiments. The method of FIG. 5 can, for example, be performed by components of the apparatus 200, architecture 300, and/or architecture 400. Thus, for example, one or more of processing circuitry 210, processor 212, memory 214, transmission power manager 216, proximity sensor 224, master radio 218, or slave radio 220 can provide means for performing one or more of the operations illustrated in and described with respect to FIG. 5.

Operation 500 can, for example, include the master radio 218 determining a transmission power of the master radio 218. The determined transmission power can, for example, comprise one or more actual instantaneous transmission powers of the master radio 218 and/or can comprise a predicted future transmission power of the master radio 218. In some example embodiments in which the master radio 218 is a cellular radio, the determined transmission power can be a transmission power configured and/or otherwise specified by a serving cellular base station, such as base station 104.

Operation 510 can include the master radio 218 providing information indicative of the transmission power determined in operation 500 to the slave radio 220. In some example embodiments, the information can be provided to the slave radio 220 via the interface 222. However, in some example embodiments, the master radio 218 can communicate the information to the slave radio 220 via an alternative interface(s), such as via the processing circuitry 210 or portion thereof.

The information can be received by the slave radio 220, and operation 520 can include the slave radio 220 determining an allowable transmission power for the slave radio 220 based at least in part on the information. For example, the slave radio 220 of some example embodiments can calculate the allowable transmission power as a function of the total transmission power limit and the transmission power of the master radio 218: Allowable Slave Tx Power=Total Transmission Power Limit−Transmission Power of Master Radio 218. In embodiments in which a buffer, Δ, is also factored, the allowable transmission power can be calculated as: Allowable Slave Tx Power=Total Transmission Power Limit−Transmission Power of Master Radio−Δ. As such, the slave radio 220 can dynamically determine its allowable transmission power and, thus the amount of back off from its maximum possible transmission power, within the confines of any applicable total transmission power limit that can be jointly applied to the master radio 218 and the slave radio 220 based on the transmission power of the master radio 218.

The slave radio 220 can use a transmission power up to the determined allowable transmission power to support a transmission. The operations of FIG. 5 can be repeated, such that the slave radio 220 can dynamically determine the allowable transmission power and adjust its transmission power in response to changes in the transmission power of the master radio 218.

In instances in which it is determined in operation 520 that the allowable transmission power is less than a transmission power being used by the slave radio 220, the slave radio 220 can be configured to reduce its transmission power in compliance with the allowable transmission power immediately or at least within a relatively short delay tolerance, such as, by way of non-limiting example, within 10 milliseconds. If, however, the allowable transmission power calculation of operation 520 indicates that a transmission power being used by the slave radio 220 is less than the allowable transmission power such that an increase in transmission power is permitted, the slave radio 220 can be configured to wait at least a delay period, such as, by way of non-limiting example, 500 milliseconds, before increasing its transmission power to verify that any decrease in transmission power of the master radio 218 resulting in the increased allowable transmission power is not transient. In this regard, waiting for the delay period before increasing the transmission power of the slave radio 220 can enable the wireless communication device to avoid exceeding the total transmission power limit in the event that a decrease in master radio 218 transmission power is transient and can provide a hysteresis condition to reduce the incidence of the slave radio 220 ping ponging between transmission power levels in response to transient changes in the transmission power of the master radio 218.

In some example embodiments, the method of FIG. 5 can be selectively performed based on the output of the proximity sensor 224. For example, in some such embodiments, if the proximity sensor 224 does not detect that the wireless communication device is proximate to a human body, each radio can transmit at up to its maximum transmission power capabilities irrespective of the transmission power used by the other radio. However, if the proximity sensor 224 detects that the wireless communication device is proximate to a human body such that a total transmission power limit is jointly applied to the master radio 218 and the slave radio 220, the method of FIG. 5 can be performed so as to control the transmission power of the slave radio 220 within its allowable transmission power based on the transmission power of the master radio 218.

In some example embodiments, the information that can be provided to the slave radio 220 in operation 510 can include a transmission power characteristic of one or more instantaneous transmission powers of the master radio 218. In this regard, the master radio 218 of some example embodiments can be configured to determine a transmission power characteristic of one or more instantaneous transmission powers of the master radio 218 that is usable by the slave radio 220 to determine an allowable transmission power in addition to or in lieu of a raw observed instantaneous and/or predicted future transmission power of the master radio 218. The transmission power characteristic can provide an indication of the transmission power of the master radio 218 over a period of time that can be a more accurate representation on which to base slave radio 220 transmission power than a single instantaneous transmission power value.

The transmission power characteristic can be defined at various levels of granularity depending on the characteristic used and/or the time period over which the characteristic is determined such that the slave radio 220 can be tuned to various tolerance levels of compliance with a total transmission power limit. For example, if better performance of the slave radio 220 is desired such that the slave radio 220 is given more opportunity to transmit at a higher transmission power at the expense of briefly exceeding the total transmission power limit on occasion, a transmission power characteristic can be selected that can allow compliance with the total transmission power limit on average, but that may allow some momentary moments at which the total transmission power of the master radio 218 and the slave radio 220 can exceed the total transmission power limit. Some example embodiments of such an averaging power concept are illustrated in and described below with respect to FIGS. 6 and 7. However, if more conservative approach yielding more consistent compliance with the total transmission power limit is desired at the expense of potentially reduced performance of the slave radio 220, a nonlinear peak power approach can be adopted to reduce the incidence of exceeding the total transmission power limit compared to the averaging power approach. Examples of the nonlinear peak power approach in accordance with some example embodiments are illustrated in and described below with respect to FIGS. 8 and 9.

Figure 6:
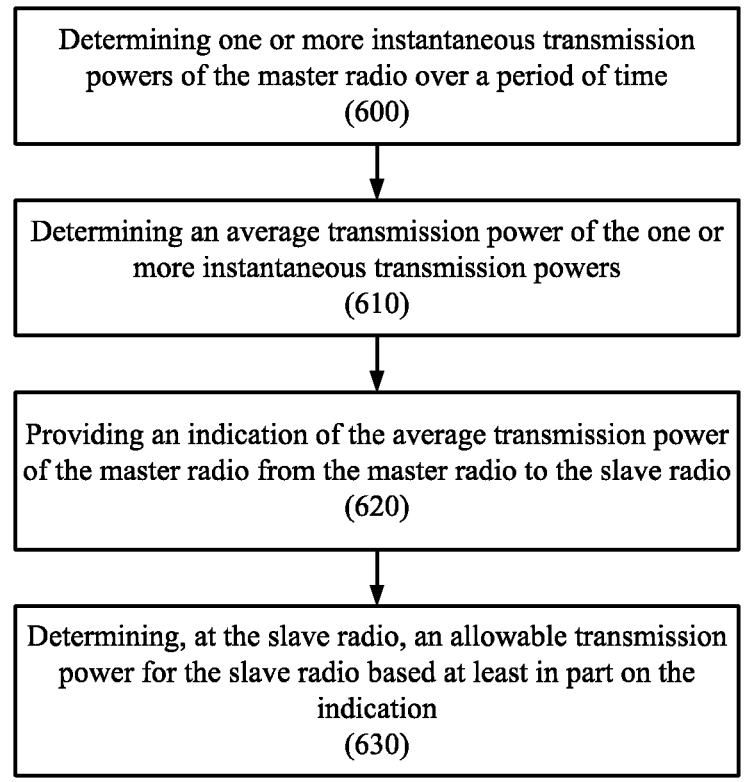
FIG. 6 illustrates a flowchart according to an example method for controlling slave radio transmission power in a multi-radio wireless communication device based at least in part on an average transmission power of a master radio in accordance with some example embodiments.

FIG. 6 illustrates a flowchart according to an example method for controlling slave radio 220 transmission power in a multi-radio wireless communication device, such as wireless communication device 102, based at least in part on an average transmission power of the master radio 218 in accordance with some example embodiments. The method of FIG. 6 can, for example, be performed by components of the apparatus 200, architecture 300, and/or architecture 400. Thus, for example, one or more of processing circuitry 210, processor 212, memory 214, transmission power manager 216, proximity sensor 224, master radio 218, or slave radio 220 can provide means for performing one or more of the operations illustrated in and described with respect to FIG. 6.

Operation 600 can include determining one or more instantaneous transmission powers of the master radio 218 over a period of time. Operation 600 can, for example, correspond to an embodiment of operation 500.

Operation 610 can include determining an average transmission power of the one or more instantaneous transmission powers. Thus, for example, operation 610 can include determining an average transmission power of the master radio 218 over the period of time.

Operation 620 can include the master radio 218 providing an indication of the average transmission power to the slave radio 220. In some example embodiments, the indication of the average transmission power can comprise an actual average transmission power value. Alternatively, in some example embodiments, the indication can comprise a quantized representation of the average transmission power value into one of a plurality of transmission power ranges, which can then be correlated into a corresponding allowable transmission power for the slave radio 220. The indication can, for example, be provided to the slave radio 220 via the interface 222. Operation 620 can accordingly correspond to an embodiment of operation 510.

Operation 630 can include the slave radio 220 determining an allowable transmission power for the slave radio 220 based at least in part on the indication. For example, in some embodiments in which the indication is an actual average transmission power value, the slave radio 220 can calculate the allowable transmission power value as a function of the total transmission power limit, the average transmission power, and optionally a buffer, A. As another example, in some embodiments, such as some embodiments in which a quantized representation of the average transmission power value is provided, which indicates which of a plurality of transmission power value ranges the average transmission power value falls in, the slave radio 220 can reference a lookup table and/or other data structure to determine an allowable transmission power value corresponding to the quantized representation. Operation 630 can accordingly correspond to an embodiment of operation 520.

In instances in which it is determined in operation 630 that the allowable transmission power is less than a transmission power being used by the slave radio 220, the slave radio 220 can be configured to reduce its transmission power in compliance with the allowable transmission power immediately or at least within a relatively short delay tolerance, such as, by way of non-limiting example, within 10 milliseconds. If, however, the allowable transmission power determination of operation 630 indicates that a transmission power being used by the slave radio 220 is less than the allowable transmission power such that an increase in transmission power is permitted, the slave radio 220 can be configured to wait at least a delay period, such as, by way of non-limiting example, 500 milliseconds, before increasing its transmission power to verify that any decrease in transmission power of the master radio 218 resulting in the increased allowable transmission power is not transient.

Figure 7:
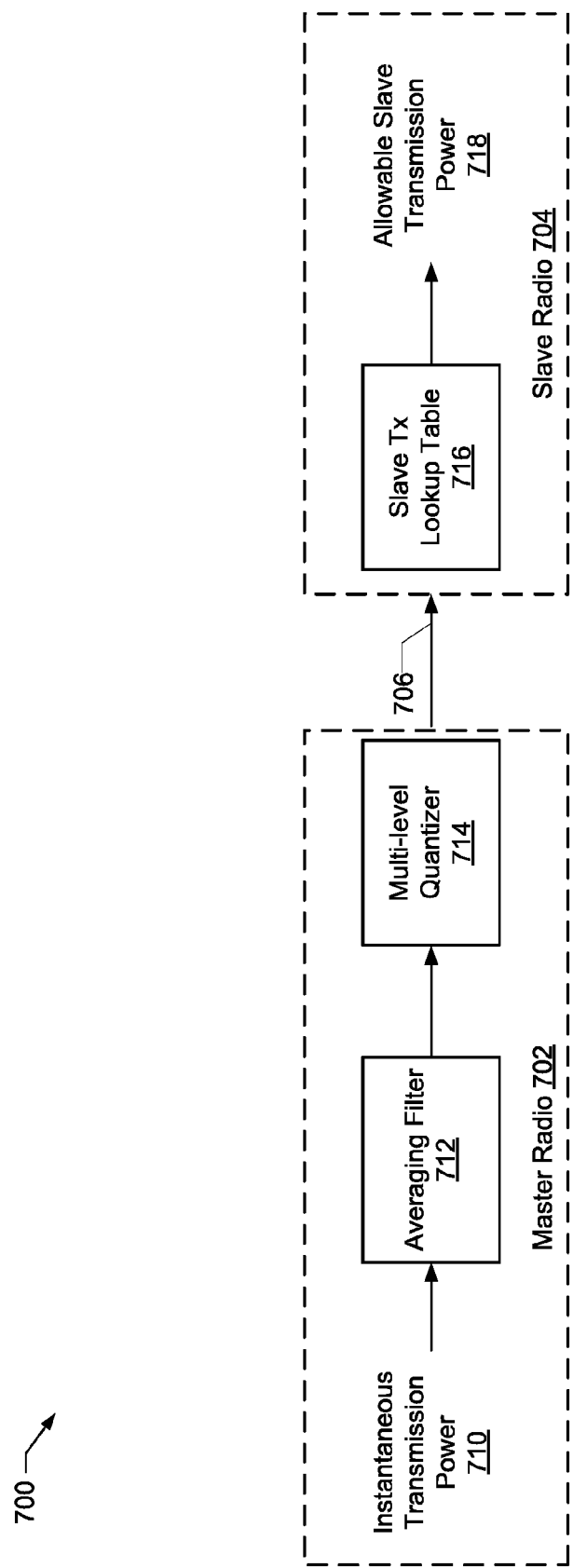
FIG. 7 illustrates an example architecture for implementing a method for controlling slave radio transmission power in a multi-radio wireless communication device based at least in part on an average transmission power of a master radio in accordance with some example embodiments.

FIG. 7 illustrates an example architecture 700 for implementing a method for controlling slave radio transmission power in a multi-radio wireless communication device based at least in part on an average transmission power of a master radio in accordance with some example embodiments. In this regard, the architecture 700 can provide an architecture for performing the method of FIG. 6 in accordance with some example embodiments. The architecture 700 can include a master radio 702 and slave radio 704, which can, for example, comprise embodiments of the master radio 218 and slave radio 220, respectively. The master radio 702 and slave radio 704 can be interfaced via an interface 706, which can, for example, comprise an embodiment of the interface 222.

The master radio 702 can include an averaging filter 712. The instantaneous transmission power 710 of the master radio 702 can be provided as an input to the averaging filter 712. The averaging filter 712 can be configured to determine an average transmission power value of a plurality of instantaneous transmission power value samples (e.g., over a windowed period of time). In this regard, the averaging filter 712 can, for example, be configured to perform operation 610. It will be appreciated that any appropriate averaging filter can be used to implement the averaging filter 712. By way of non-limiting example, an infinite impulse response (IIR) filter, a windowed filter, some combination thereof, or the like can be used to implement the averaging filter 712.

The master radio 702 can further include a multi-level quantizer 714. The output of the averaging filter 712 (e.g., the average transmission power of the master radio 702) can be provided as an input to the multi-level quantizer 714. The multi-level quantizer can be configured to quantize the average transmission power into one of a plurality of levels.

Depending on the desired level of granularity, any number of levels can be implemented. For example, in some embodiments, the quantizer 714 can be a 1-bit quantizer, which can be configured to indicate whether the average transmission power is above or below a defined threshold. As another example, in some embodiments, the quantizer 714 can be a 2-bit quantizer that can be configured to quantize the average transmission power into one of four defined transmission power ranges. As a non-limiting example of transmission power ranges that can be applied in order to provide an example of how a 2-bit quantizer can be implemented, a first quantized value can indicate that the average transmission power is in excess of 18 dBm; a second quantized value can indicate that the average transmission power is between 15 dBm and 18 dBm; a third quantized value can indicate that the average transmission power is between 10 dBm and 15 dBm; and a fourth quantized value can indicate that the average transmission power is less than 10 dBm. The concept can be similarly applied using a quantizer providing a 3 or more bit output. Also, the transmission power ranges can be tweaked depending on the general transmission power level of the master radio 702, such as can vary on a type of RAT implemented by the master radio 702, and a desired tolerance level with respect to compliance with the applicable total transmission power limit.

The output of the multi-level quantizer 714 can be provided to the slave radio 704 via the interface 706. The slave radio 704 can be configured to lookup the quantized value in a lookup table 716 or other data structure, which can define associations between each possible output of the multi-level quantizer 714 and a respective allowable transmission power value. The result of the lookup can accordingly yield the allowable slave transmission power value 718, which can be used by the slave radio 704. In this regard, the lookup table 716 can, for example, be used to perform operation 630.

It will be appreciated that the method illustrated in and described with respect to FIGS. 6 and 7 is provided by way of example, and not by way of limitation. In this regard, the operations performed to enable implementation of an averaging power concept in accordance with various example embodiments can be distributed among the master radio 218 and slave radio 220 and/or among other components of the apparatus 200 in a different manner than illustrated in FIGS. 6 and 7. For example, in some embodiments, the master radio 218 can provide the slave radio 220 with actual instantaneous transmission power values of the master radio 218, and the slave radio 220 can perform averaging of the instantaneous transmission power values.

The averaging power concept, such as illustrated in and described can yield a significant improvement in the transmission power of the slave radio 220 compared to prior art approaches that always assume the worst case scenario in which a radio is transmitting at its maximum capable power. As an example in which the master radio 218 can be embodied as a Long Term Evolution cellular radio, a maximum transmission power of the master radio 218 can be 23 dBm. However, in the case of bursty cellular traffic, such as Voice over LTE (VoLTE) traffic, the cellular radio may only be transmitting at a high power for periodic brief periods of time, such as for only 1 or 2 subframes out of every 20. If the slave radio 220 were to assume a worst case transmission power for the cellular radio, there would be long stretches in which the slave radio 220 would needlessly back off its transmission power even when the cellular radio is not even transmitting due to the bursty nature of the traffic. Thus, by averaging the transmission power of the cellular radio over a period of time and calculating the allowable slave transmission power based on the average, significant gains in transmission power and performance of the slave radio 220 can be gained. However, the total transmission power limit can be exceeded on occasion, such as during the subframes in which the cellular radio can be transmitting the bursty traffic at a high transmission power.

Figure 8:
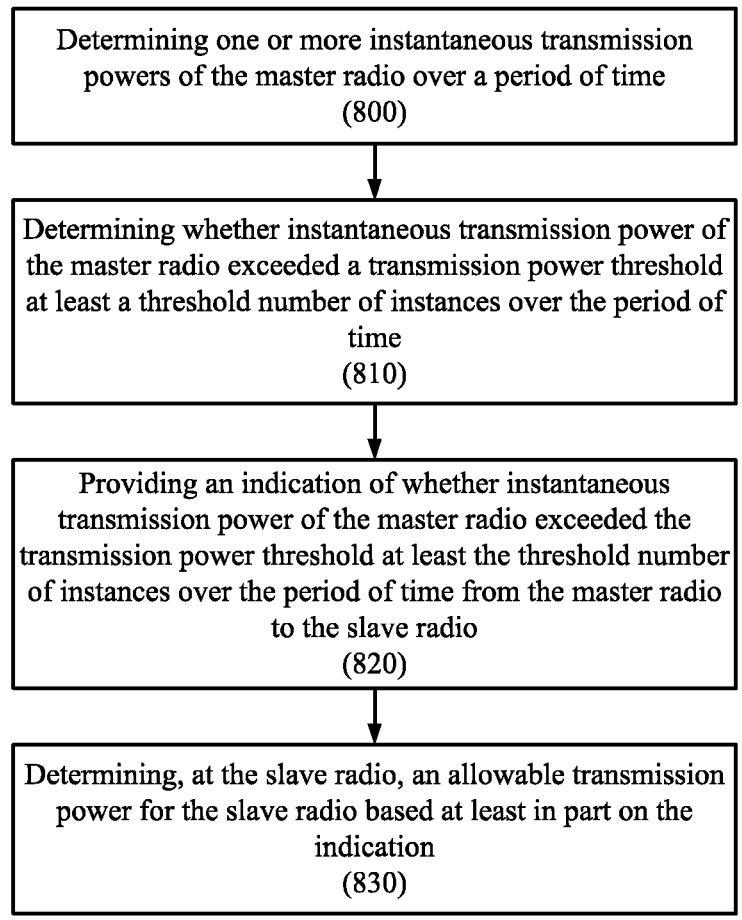
FIG. 8 illustrates a flowchart according to an example method for controlling slave radio transmission power in a multi-radio wireless communication device based at least in part on a nonlinear peak power of a master radio in accordance with some example embodiments.

FIG. 8 illustrates a flowchart according to an example method for controlling slave radio 220 transmission power in a multi-radio wireless communication device, such as wireless communication device 102, based at least in part on a nonlinear peak power of a master radio 218 in accordance with some example embodiments. The method of FIG. 8 can, for example, be performed by components of the apparatus 200, architecture 300, and/or architecture 400. Thus, for example, one or more of processing circuitry 210, processor 212, memory 214, transmission power manager 216, proximity sensor 224, master radio 218, or slave radio 220 can provide means for performing one or more of the operations illustrated in and described with respect to FIG. 8.

Operation 800 can include determining one or more instantaneous transmission powers of the master radio 218 over a period of time, L1 (e.g., L1 seconds). Operation 800 can, for example, correspond to an embodiment of operation 500.

Operation 810 can include determining whether instantaneous transmission power of the master radio 218 exceeded a transmission power threshold, T1, at least a threshold number, T2, of instances over the period of time, L1. In this regard, T1 can be a power threshold; T2 can be a counter threshold; and L1 can be a timer-based threshold. By way of non-limiting example, in some embodiments, such as some embodiments in which the master radio 218 is a cellular radio, T1 can be defined as 22.25 dBm, L1 can be defined as 3 seconds, and T2 can be defined as 1. Thus, operation 810 can include determining whether the number of instances, N, in which the instantaneous transmission power exceeded T1 over a period of length, L1, is greater than or equal to T2.

The transmission power threshold, T1, and the threshold number of instances, T2, that can be evaluated in operation 810 can be selected based on factors, such as a desired level of compliance with the applicable total transmission power limit on an instantaneous basis, a desired performance of the slave radio 220, the RATs used by the master radio 218 and slave radio 220, and/or other factors. In a simple case, T2 can be defined as 1. However, if a better performance level of the slave radio 220 (e.g., higher transmission power level) is desired and it is considered acceptable for the total cumulative transmission power of the master radio 218 and slave radio 220 to exceed the total transmission power limit on occasion, T2 can be defined as a higher threshold (e.g., 2 or more) such that back off of the transmission power of the slave radio 220 may be triggered less frequently in response to a temporary increase in the transmission power of the master radio 218 above T1.

Operation 820 can include the master radio 218 providing an indication to the slave radio 220 indicating whether instantaneous transmission power of the master radio 218 exceeded the transmission power threshold, T1, at least the threshold number, T2, of instances over the period of time, L1. In this regard, the nonlinear peak power approach can implement a windowed peak detection algorithm based on the peak (or peaks) instantaneous transmission power of the master radio 218 over the time period. The indication can, for example, be provided to the slave radio 220 via the interface 222. Operation 820 can accordingly correspond to an embodiment of operation 510.

Operation 830 can include the slave radio 220 determining an allowable transmission power for the slave radio 220 based at least in part on the indication. For example, in some embodiments, the slave radio 220 can reference a lookup table and/or other data structure that can define a first transmission power to use in an instance in which instantaneous transmission power of the master radio 218 exceeded the transmission power threshold, T1, at least the threshold number, T2, of instances over the period of time, L1; and a second transmission power to use in an instance in which instantaneous transmission power of the master radio 218 did not exceed the transmission power threshold, T1, at least the threshold number, T2, of instances over the period of time, L1. Operation 830 can accordingly correspond to an embodiment of operation 520.

In instances in which it is determined in operation 830 that the allowable transmission power is less than a transmission power being used by the slave radio 220, the slave radio 220 can be configured to reduce its transmission power in compliance with the allowable transmission power immediately or at least within a relatively short delay tolerance, such as, by way of non-limiting example, within 10 milliseconds. If, however, the allowable transmission power determination of operation 830 indicates that a transmission power being used by the slave radio 220 is less than the allowable transmission power such that an increase in transmission power is permitted, the slave radio 220 can be configured to wait at least a delay period, such as, by way of non-limiting example, 500 milliseconds, before increasing its transmission power to verify that any decrease in transmission power of the master radio 218 resulting in the increased allowable transmission power is not transient.

It will be appreciated that in some example embodiments, the method of FIG. 8 can be extended to consider multiple thresholds for the transmission power of the master radio 218 and/or multiple thresholds for number of instances in which the instantaneous transmission power of the master radio 218 exceed a transmission power threshold. As a non-limiting example, a first transmission power threshold, T1_low, and a second transmission power threshold, T1_high, can be defined, where T1_high>T1_low. If there have not been at least T2 instances in which the instantaneous transmission power exceeded T1_low over the last L1 seconds, a first allowable transmission power can be applied by the slave radio 220. However, if there have been at least T2 instances in which the instantaneous transmission power exceeded T1_low over the last L1 seconds, but not T2 instances in which the instantaneous transmission power exceeded T1_high over the last L1 seconds, a second allowable transmission power can be applied by the slave radio 220. Finally, if there have been at least T2 instances in which instantaneous transmission power exceeded T1_high over the last L1 seconds, a third allowable transmission power can be applied by the slave radio 220. The first allowable transmission power can be greater than the second allowable transmission power, which can, in turn, be greater than the third allowable transmission power.

As another example, there can be a different set of thresholds that can be applied for raising the transmission power of the slave radio 220 than for lowering the transmission power of the slave radio 220, such as to prevent hysteresis. For example, if N≥T2 for L1 seconds, the transmission power of the slave radio 220 can be reduced. However, if N<T3 for and L2 second period, the allowable transmission power of the slave radio 220 can be increased. The values of T3 and L2 can be defined to be equal to T2 and L1, respectively, in some example embodiments. However, in some embodiments, T3 and L2 can be tuned so as to prevent hysteresis and/or to reduce the incidence of the total transmission power exceeding the total transmission power limit on an instantaneous basis. For example, L2 can be defined as a longer time period than L1 such that transmission conditions can be required to be relatively stable over a longer period of time to increase the transmission power of the slave radio 220 than to decrease the transmission power of the slave radio 220. Additionally or alternatively, as another example, T3 can be defined as a lower threshold than T2 to prevent hysteresis conditions.

Figure 9:
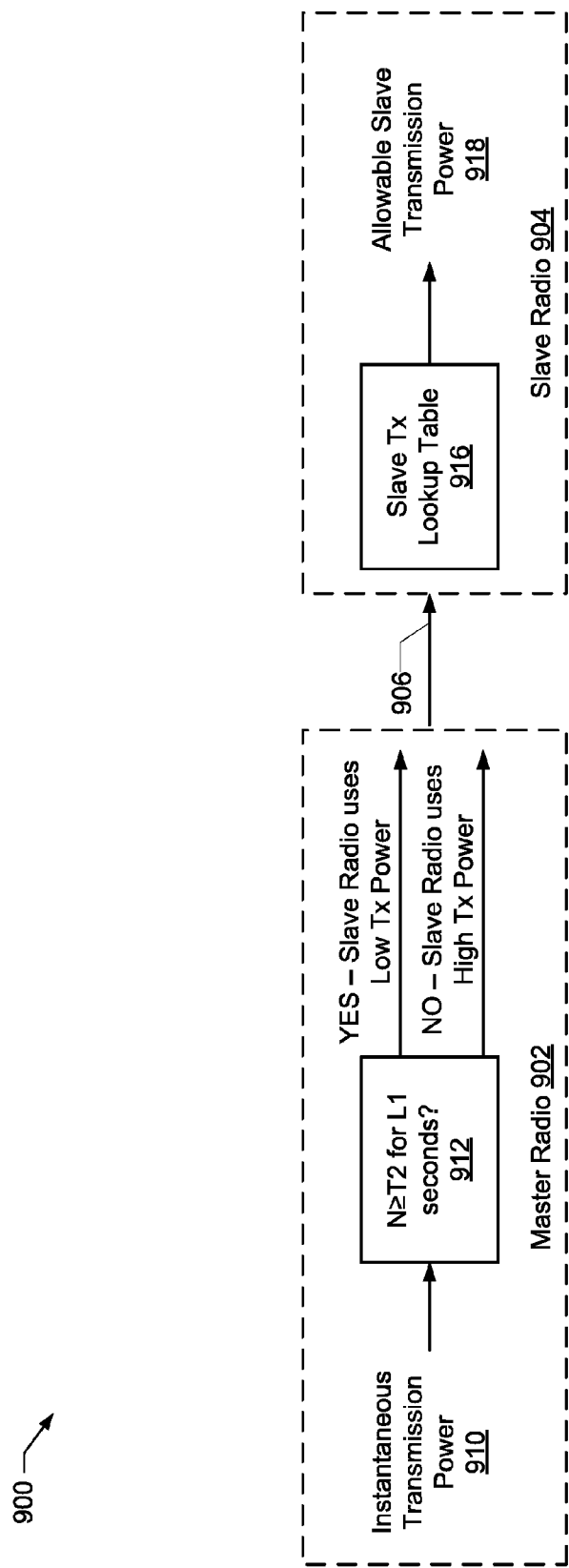
FIG. 9 illustrates an example architecture for implementing a method for controlling slave radio transmission power in a multi-radio wireless communication device based at least in part on a nonlinear peak power of a master radio in accordance with some example embodiments.

FIG. 9 illustrates an example architecture 900 for implementing a method for controlling slave radio transmission power in a multi-radio wireless communication device based at least in part on a nonlinear peak power of a master radio in accordance with some example embodiments. In this regard, the architecture 900 can provide an architecture for performing the method of FIG. 8 in accordance with some example embodiments. The architecture 900 can include a master radio 902 and slave radio 904, which can, for example, comprise embodiments of the master radio 218 and slave radio 220, respectively. The master radio 902 and slave radio 904 can be interfaced via an interface 906, which can, for example, comprise an embodiment of the interface 222.

The master radio 902 can include a logic block 912, which can be configured to accept instantaneous transmission power 910 of the master radio 902 as input. The logic block 912 can be implemented as dedicated circuitry, a processor executing program code, a memory storing executable program code, some combination thereof, or the like. In some example embodiments, one or more of processing circuitry 210 or transmission power manger 216 can be configured to implement at least some functionality of the logic block 912. The logic block 912 can be configured to determine the number of instances, N, over the previous L1 seconds (e.g., 1 second) that the instantaneous transmission power 910 exceeded a transmission power threshold, T1. The logic block 912 can be further configured to determine whether N is greater than or equal to a threshold, T2, over the L1 second period. In this regard, the logic block 912 can, for example, be configured to perform operation 810.

If the logic block 912 determines that N≥T2 for L1 seconds, the master radio 902 can indicate this determination (e.g., "YES") to the slave radio 904, via interface 906, which can prompt the slave radio 904 to use a first (e.g., low) transmission power, as described further below. If, however, the logic block 912 determines that N<T2 for L1 seconds, the master radio 902 can indicate this determination (e.g., "NO") to the slave radio 904, which can prompt the slave radio 904 to use a second (e.g., high) transmission power, as described further below.

The slave radio 904 can receive the indication (e.g., "YES/NO" and/or other indication of the determination of the logic block 912) that can be provided by the master radio 902, and can be configured to lookup the indication in a lookup table 916 or other data structure, which can define associations between indications that can be provided by the master radio 902 respective allowable transmission power values. The result of the lookup can accordingly yield the allowable slave transmission power value 918, which can be used by the slave radio 904. In this regard, the lookup table 916 can, for example, be used to perform operation 930.

It will be appreciated that the method illustrated in and described with respect to FIGS. 8 and 9 is provided by way of example, and not by way of limitation. In this regard, the operations performed to enable implementation of a nonlinear peak power concept in accordance with various example embodiments can be distributed among the master radio 218 and slave radio 220 and/or among other components of the apparatus 200 in a different manner than illustrated in and described with respect to FIGS. 8 and 9. For example, in some embodiments, the master radio 218 can provide the slave radio 220 with actual instantaneous transmission power values of the master radio 218, and the slave radio 220 can perform the threshold comparisons, such as determining the number of instances N and determining whether N≥T2 based on raw instantaneous transmission power values of the master radio 902, as described with respect to logic block 912 and operation 810. As another example, in some embodiments, the master radio 218 can provide the slave radio 220 with an indication of when the instantaneous transmission power exceeds a transmission power threshold, and the slave radio can count the number of such instances, N, over a time period, L1, and can determine whether N≥T2.

While the total transmission power of the master radio 218 and slave radio 220 can still exceed total transmission power limit on occasion when using the nonlinear peak power approach discussed with respect to FIGS. 8 and 9, the frequency of such instances can be significantly less and, in some scenarios, several orders of magnitude less than the averaging concept discussed with respect to FIGS. 6 and 7. However, the transmission power gain in slave radio transmission power compared to prior approaches that assume maximum transmission power of the master radio can be less than when using the averaging concept in some scenarios.

In some example embodiments, the master radio 218 can provide the slave radio 220 with an indication of a predicted future transmission power rather than providing information indicative of an actual observed prior and/or current transmission power or characteristic(s) thereof. In such embodiments, the slave radio 220 can determine an allowable transmission power given the predicted future transmission power of the master radio 218 in time to adjust (if appropriate) its transmission power in advance of the transmission by the master radio 218. Assuming the master radio 218 does not exceed the indicated future transmission power, the slave radio 220 can realize an improved transmission power compared to prior approaches in which the maximum transmission power of the master radio 218 is always assumed by the slave radio 220, while avoiding instances of exceeding the applicable total transmission power limit on an instantaneous basis as can occur with the approaches discussed with respect to FIGS. 6-9.

Figure 10:
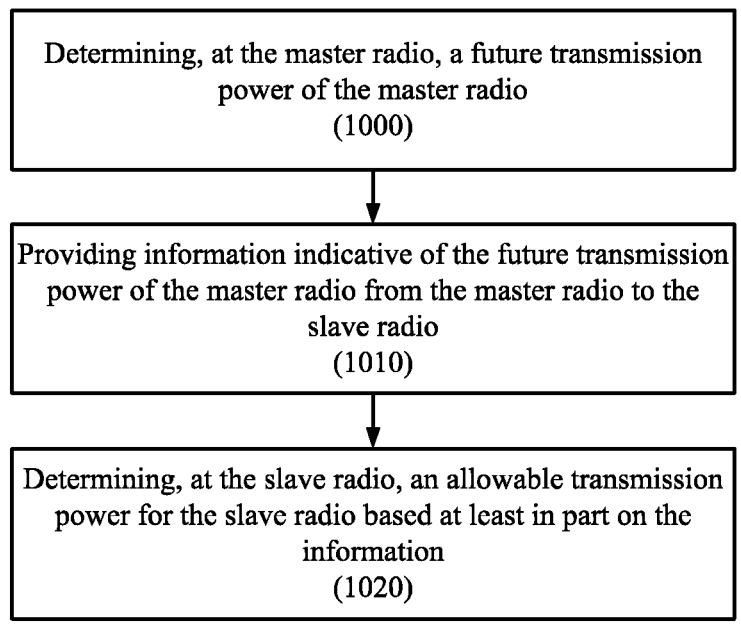
FIG. 10 illustrates a flowchart according to an example method for controlling slave radio transmission power in a multi-radio wireless communication device based at least in part on a predicted future transmission power of a master radio in accordance with some example embodiments.

FIG. 10 illustrates a flowchart according to an example method for controlling slave radio transmission power in a multi-radio wireless communication device, such as wireless communication device 102, based at least in part on a predicted future transmission power of a master radio in accordance with some example embodiments. The method of FIG. 10 can, for example, be performed by components of the apparatus 200, architecture 300, and/or architecture 400. Thus, for example, one or more of processing circuitry 210, processor 212, memory 214, transmission power manager 216, proximity sensor 224, master radio 218, or slave radio 220 can provide means for performing one or more of the operations illustrated in and described with respect to FIG. 10.

Operation 1000 can, for example, correspond to an embodiment of operation 500, and can include the master radio 218 determining a future transmission power of the master radio 218. In this regard, the master radio 218 of some example embodiments can have advance notice of a predicted future transmission power. For example, in some embodiments, the master radio 218 can autonomously set its transmission power within limits, such as any applicable total transmission power limit on the device and/or a maximum transmission power capability of the master radio 218, and can determine its transmission power sufficiently in advance of a transmission to alert the slave radio 220. As another example, in some embodiments, the master radio 218 can be assigned a transmission power in advance of a transmission, such as by a higher layer entity of the wireless communication device and/or by another device or entity with which the wireless communication device can be communicating. For example, in some embodiments in which the slave radio 220 is a cellular radio, a serving cellular base station, such as base station 104, can configure a transmission power to be used for a given transmission time interval (TTI) in advance of the TTI. For example, in LTE systems, the serving evolved node B can inform a wireless communication device, such as wireless communication device 102, of a transmission power value to use for a scheduled transmission approximately 4 milliseconds in advance of the transmission.

Operation 1010 can include the master radio 218 providing information indicative of the future transmission power of the master radio 218 to the slave radio 220, such as via the interface 222. In this regard, operation 1010 can, for example, correspond to an embodiment of operation 510. In some example embodiments, the information can comprise the actual predicted future transmission power. However, in some embodiments, such as that illustrated in and described below with respect to FIG. 11, the master radio 218 can determine whether the future transmission power exceeds a threshold transmission power and, if so, can provide an indication to the slave radio 220 to apply a transmission power cap such that the slave radio 220 backs off its transmission power to comply with a total transmission power limit.

Operation 1010 can be performed sufficiently in advance of the future transmission to enable the slave radio 220 to adjust its transmission power, if appropriate. For example, in some embodiments in which the master radio 218 is a cellular radio and receives an indication of the transmission power to use from a serving base station approximately 4 milliseconds in advance of the transmission, it can take approximately 2 milliseconds to process the instruction and the slave radio 220 can be provided with the indication of the future transmission power approximately 2 milliseconds in advance of the transmission by the master radio 218.

Operation 1020 can include the slave radio 220 determining an allowable transmission power for the slave radio 220 based at least in part on the information. In this regard, operation 1020 can correspond to an embodiment of operation 520.

Figure 11:
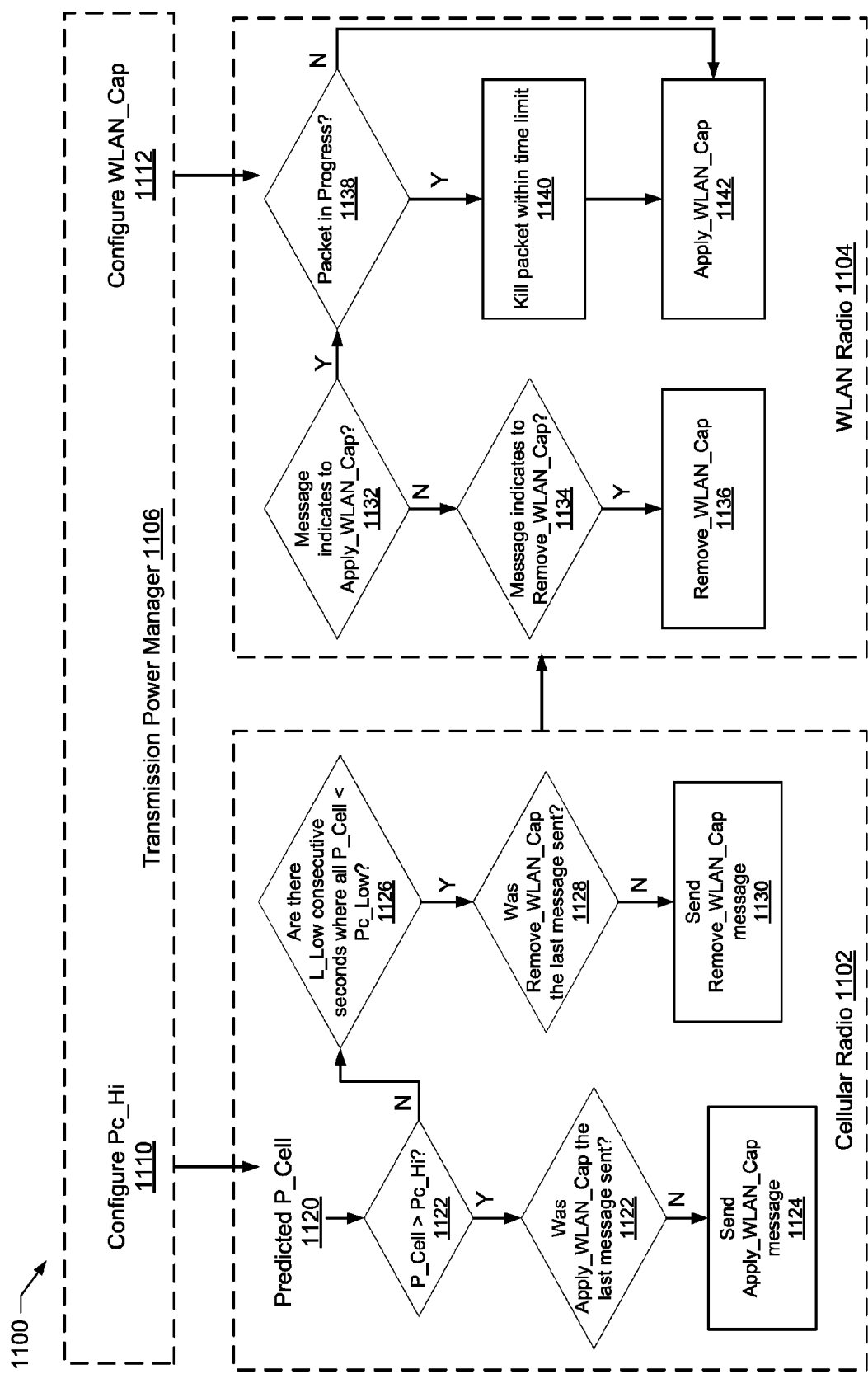
FIG. 11 illustrates an example architecture and a corresponding flowchart according to an example method for controlling slave radio transmission power in a multi-radio wireless communication device based at least in part on a predicted future transmission power of a master radio in accordance with some example embodiments.

FIG. 11 illustrates an example architecture and a corresponding flowchart according to an example method for controlling slave radio transmission power in a multi-radio wireless communication device based at least in part on a predicted future transmission power of a master radio in accordance with some example embodiments. More particularly, FIG. 11 illustrates an example embodiment of the method of FIG. 10 in which a cellular radio 1102 is configured as a master radio and a WLAN radio 1104 is configured as the slave radio, and the cellular radio 1102 instructs the WLAN radio 1104 whether to apply a transmission power cap in advance of a transmission based on a predicted future transmission power of the cellular radio 1102.

The cellular radio 1102 can, for example, be an embodiment of the master radio 218. The WLAN radio 1104 can similarly be an embodiment of the slave radio 220. The cellular radio 1102 and WLAN radio 1104 can be interfaced with a transmission power manager 1106, which can, for example, be an embodiment of transmission power manager 216. The transmission power manager 1106 can configure the cellular radio 1102 with a transmission power threshold, Pc_Hi. The transmission power manager 1106 can be further configured to configure the WLAN radio 1104 with a transmission power cap, WLAN_Cap to be applied when indicated by the cellular radio 1102. The values of Pc_Hi and WLAN_Cap can, for example, be defined in some embodiments as a function of factors, such as a frequency band being used for transmission by the cellular radio 1102 and/or by the WLAN radio 1104, a frequency or frequencies within a band being used for transmission by the cellular radio 1102 and/or by the WLAN radio 1104, the device antenna configurations (e.g., placement of antennas within the device, an antenna being used for transmission when multiple antennas are available, and/or other antenna configuration qualities), a proxy state, a MIMO mode being used by the cellular radio 1102 and/or by the WLAN radio 1104 (if applicable), and/or other factors that can affect the radio frequency absorption rate, and thus the applicable total transmission power limit.

Alternatively, in some embodiments, Pc_Hi and WLAN_Cap can be defined as static values regardless of the actual operating conditions.

Pc_Hi and WLAN_Cap can be defined such that if a transmission power level of the cellular radio 1102 is to exceed Pc_Hi, a reduction in transmission power of the WLAN radio 1104 in accordance with the WLAN_Cap value can be required to satisfy the total transmission power limit. However, if the transmission power level of the cellular radio does not exceed Pc_Hi, the WLAN radio 1104 can be permitted to transmit without capping its transmission power. In this regard, Pc_Hi and WLAN_Cap values can be selected in some example embodiments such that the total transmission power limit is never exceeded, even on a transient basis.

The cellular radio 1102 can determine a Predicted P_Cell value, which can be the predicted future transmission power, such as can be configured by a serving base station. At operation 1122, the cellular radio 1102 can determine whether P_Cell is greater than Pc_Hi. If it is determined that P_Cell is greater than Pc_Hi, the method can proceed to operation 1122, in which the cellular radio 1102 can determine if the last message sent to the WLAN radio 1104 was an instruction to apply the WLAN_Cap (e.g., Apply_WLAN_Cap). If the last message did not indicate to apply the WLAN_Cap, such as if a message to stop applying the WLAN_Cap (e.g., Remove_WLAN_Cap) was the last instruction sent to the WLAN radio 1104, the method can proceed to operation 1124, which can include the cellular radio 1102 sending an Apply_WLAN_Cap message to the WLAN radio 1104. If, however, it is determined at operation 1122 that the last message was Apply_WLAN_Cap, the method can terminate until the next Predicted P_Cell value is received.

Returning to operation 1122, if it is instead determined that P_Cell is not greater than Pc_Hi, the method can proceed to operation 1126, in which the cellular radio 1102 can determine if there have been L_Low consecutive seconds where P_Cell has been less than a transmission power threshold, Pc_Low. In this regard, operation 1126 can comprise determining whether certain thresholds have been met for removing the WLAN_Cap and/or otherwise permitting an increase in the transmission power of the WLAN radio 1104. In some embodiments, Pc_Low can be set equal to Pc_Hi. However, in some embodiments, Pc_Low can be set to a lower value than Pc_Hi as a safeguard to reduce the chance of exceeding the total transmission power limit and to prevent hysteresis conditions. L_Low can similarly be set to any desired period so as to avoid increasing the transmission power of the WLAN radio 1104 in response to a transient change in condition. As a non-limiting example, in some embodiments L_Low can be set to 500 milliseconds.

If it is determined at operation 1126 that the condition is not satisfied, the method can terminate until the next Predicted P_Cell value is received. However, if it is determined at operation 1126 that the condition is satisfied, the method can proceed to operation 1128, which can include the cellular radio 1102 determining if the last message sent to the WLAN radio 1104 was an instruction to remove the WLAN Cap (e.g., Remove_WLAN_Cap). If the last message sent to the WLAN radio 1104 did not indicate to remove the WLAN_Cap, such as if a message to apply the WLAN_Cap (e.g., Apply_WLAN_Cap) was the last instruction sent to the WLAN radio 1104, the method can proceed to operation 1130, which can include the cellular radio 1102 sending a Remove_WLAN_Cap message to the WLAN radio 1104. If, however, it is determined at operation 1128 that the last message was Remove_WLAN_Cap, the method can terminate until the next Predicted P_Cell value is received.

On the WLAN radio 1104 side, if the WLAN radio 1104 receives an instruction from the cellular radio 1102, the WLAN radio 1104 can determine whether the message indicates to apply the WLAN_Cap or to remove the WLAN_Cap, as illustrated by operations 1132 and 1134. If the message indicates that the WLAN_Cap can be removed, the WLAN radio 1104 can cease application of the WLAN_Cap and can transmit at a higher power level, as illustrated in operation 1136.

If, however, the message has instructed the WLAN radio 1104 to apply the WLAN_Cap, the WLAN radio 1104 can determine if there is a packet in progress (e.g., a packet for which transmission will continue into the future transmission of the cellular radio 1102 for which the WLAN_Cap is to be applied), at operation 1138. Operation 1138 can, for example, include determining if there is a media access control (MAC) protocol data unit (PDU) in progress. If it is determined that there is a packet in progress, the method can include operation 1140, which can include the WLAN radio 1104 killing the packet within a time limit, such as by way of non-limiting example, within 1 millisecond. Killing the packet can include stopping transmission of the packet before completion to avoid exceeding the total transmission power limit. If, however, there is not such a packet in progress, operation 1140 can be omitted. Operation 1142 can include the WLAN radio 1104 applying the WLAN_Cap.

While various example embodiments have been described with respect to two radios, it will be appreciated that the techniques and architectures illustrated and described herein can be applied mutatis mutandis to wireless communication devices including three or more radios that can transmit concurrently and which can be subject to a jointly applied total transmission power limit. In this regard, there can be multiple slave radios, which can, for example, be prioritized such that each slave radio determines its allowable transmission power in priority order based on information received from a master radio and/or a higher priority slave radio. In this regard, a first slave radio having a higher priority than a second slave radio can function as a master radio to the second slave radio.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method comprising:
   in a wireless communication device including a cellular radio and a wireless local area network (WLAN) radio:
      determining, at the cellular radio, instantaneous transmission power values of the cellular radio over a period of time;
      providing information indicative of the instantaneous transmission power values of the cellular radio for the period of time from the cellular radio to the WLAN radio via a direct interface between the cellular radio and the WLAN radio; and
      determining, at the WLAN radio, an allowable transmission power for the WLAN radio based at least in part on the information, wherein:
         a sum of the allowable transmission power for the WLAN radio and the transmission power of the cellular radio does not exceed a total transmission power limit, and
         the allowable transmission power for the WLAN radio is determined based at least in part on an integer number N of distinct time instances that the instantaneous transmission power values of the cellular radio exceeds a transmission power threshold over the period of time when N>1,
   wherein the direct interface:
      is dedicated to communication between the cellular radio and the WLAN radio, and
      operates at a lower latency than communication interfaces between either the cellular radio or the WLAN radio and processing circuitry of the wireless communication device.

2. The method of claim 1, wherein:
the information indicative of the instantaneous transmission power values of the cellular radio comprises an indication of whether the integer number N of distinct time instances over the period of time that the instantaneous transmission power of the cellular radio exceeded the transmission power threshold exceeds a positive integer threshold number $T \geq 2$ of instances; and
determining the allowable transmission power for the WLAN radio comprises the WLAN radio reducing its transmission power in at least one instance in which the instantaneous transmission power of the cellular radio exceeds the transmission power threshold at least the positive integer threshold number T of instances over the period of time.

3. The method of claim 1, further comprising:
determining a transmission power of a future transmission by the cellular radio; and
providing information indicative of the transmission power of the future transmission by the cellular radio via the direct interface between the cellular radio and the WLAN radio.

4. The method of claim 3, wherein the transmission power of the future transmission by the cellular radio comprises a transmission power configured by a serving cellular base station for the wireless communication device.

5. The method of claim 3, wherein the method further comprises:
determining whether the transmission power of the future transmission exceeds a first transmission power threshold; and
in an instance in which it is determined that the transmission power of the future transmission exceeds the first transmission power threshold, providing information indicative of the transmission power of the future transmission by the cellular radio comprises providing an instruction in advance of the future transmission by the cellular radio to the WLAN radio to apply a WLAN transmission power cap.

6. The method of claim 1, wherein the total transmission power limit is defined based at least in part on a regulation restricting radio frequency emissions by the wireless communication device.

7. The method of claim 1, wherein the direct interface between the cellular radio and the WLAN radio comprises a wireless coexistence interface (WCI) directly coupling the cellular radio with the WLAN radio and configured to support exchanging state information of the cellular radio and of the WLAN radio usable to support in-device wireless coexistence between the cellular radio and the WLAN radio.

8. The method of claim 2, wherein the period of time comprises a first period of time and the transmission power threshold comprises a first transmission power threshold, the method further comprising:
determining, at the cellular radio, instantaneous transmission power values of the cellular radio over a second period of time that follows the first period of time;
providing second information indicative of the instantaneous transmission power values of the cellular radio for the second period of time from the cellular radio to the WLAN radio via the direct interface between the cellular radio and the WLAN radio; and
determining, at the WLAN radio, the allowable transmission power for the WLAN radio based at least in part on the second information, wherein:
the allowable transmission power for the WLAN radio is determined based at least in part on the number of distinct time instances that the instantaneous transmission power values of the cellular radio exceeds a second transmission power threshold over the second period of time, and
the second transmission power threshold is less than the first transmission power threshold.

9. The method of claim 8, wherein:
the transmission power for the WLAN radio is reduced when the number of distinct time instances that the instantaneous transmission power of the cellular radio exceeds the transmission power threshold over the first period of time exceeds a first positive integer threshold number of instances; and
the transmission power for the WLAN radio is allowed to increase after a previous reduction when the number of distinct time instances that the instantaneous transmission power values of the cellular radio exceeds the second transmission power threshold over the second period of time falls below a second positive integer threshold number of instances.

10. A wireless communication device comprising:
a master radio;
a slave radio communicatively coupled with the master radio via a direct interface between the master radio and the slave radio; and
processing circuitry, wherein the processing circuitry is configured to cause the wireless communication device to at least:
determine, at the master radio, instantaneous transmission power values of the master radio over a period of time;
provide information indicative of the instantaneous transmission power values of the master radio for the period of time from the master radio to the slave radio via the direct interface between the master radio and the slave radio; and
determine, at the slave radio, an allowable transmission power for the slave radio based at least in part on the information, wherein:
a sum of the allowable transmission power for the slave radio and the transmission power of the master radio does not exceed a total transmission power limit, and
the allowable transmission power for the slave radio is determined based at least in part on an integer number N of distinct time instances that the instantaneous transmission power values of the master radio exceeds a transmission power threshold over the period of time when N>1,
wherein the direct interface:
is dedicated to communication between the master radio and the slave radio, and
operates at a lower latency than communication interfaces between either the master radio or the slave radio and host processing circuitry of the wireless communication device.

11. The wireless communication device of claim 10, wherein the master radio comprises a cellular radio, and wherein the slave radio comprises a wireless local area network (WLAN) radio.

12. The wireless communication device of claim 10, wherein:
the information indicative of the instantaneous transmission power values of the master radio comprises an indication of whether the integer number N of distinct time instances over the period of time that the instantaneous transmission power of the master radio exceeded the transmission power threshold exceeds a positive integer threshold number T≥2 of instances; and determine the allowable transmission power for the slave radio at least in part by causing the slave radio to reduce its transmission power in at least one instance in which the instantaneous transmission power of the master radio exceeds the transmission power threshold at least the positive integer threshold number of instances T over the period of time.

13. The wireless communication device of claim 10, wherein the processing circuitry is further configured to cause the wireless communication device to:

determine a transmission power of a future transmission by the master radio; and provide the slave radio with information indicative of the transmission power of the future transmission by the master radio via the direct interface between the master radio and the slave radio.

14. The wireless communication device of claim 10, wherein the master radio is implemented on a first chipset and the slave radio is implemented on a second chipset, and wherein the first chipset and the second chipset are communicatively coupled via the direct interface.

15. The wireless communication device of claim 10, wherein the master radio, the slave radio, and the host processing circuitry are implemented on a single chipset.

16. The wireless communication device of claim 10, wherein the total transmission power limit comprises a specific absorption rate (SAR) limit.

17. The wireless communication device of claim 12, wherein the period of time comprises a first period of time and the transmission power threshold comprises a first transmission power threshold, the processing circuitry further configured to cause the wireless communication device to:

determine, at the master radio, instantaneous transmission power values of the master radio over a second period of time that follows the first period of time;

provide second information indicative of the instantaneous transmission power values of the master radio for the second period of time from the master radio to the slave radio via the direct interface between the master radio and the slave radio; and determine, at the slave radio, the allowable transmission power for the slave radio based at least in part on the second information, wherein:

the allowable transmission power for the slave radio is determined based at least in part on the number of distinct time instances that the instantaneous transmission power values of the master radio exceeds a second transmission power threshold over the second period of time, and the second transmission power threshold is less than the first transmission power threshold.

18. The wireless communication device of claim 17, wherein:

the transmission power for the slave radio is reduced when the number of distinct time instances that the instantaneous transmission power of the master radio exceeds the transmission power threshold over the first period of time exceeds a positive integer threshold number of instances; and the transmission power for the slave radio is allowed to increase after a previous reduction when the number of distinct time instances that the instantaneous transmission power values of the master radio exceeds the second transmission power threshold over the second period of time falls below a second positive integer threshold number of instances.

19. A non-transitory computer readable storage medium storing instructions that, when executed by one or more processors implemented on a multi-radio wireless communication device including a master radio and a slave radio, cause the wireless communication device to perform a method comprising:

determining, at the master radio, instantaneous transmission power values of the master radio over a period of time;

providing information indicative of the instantaneous transmission power values of the master radio for the period of time from the master radio to the slave radio via a direct interface between the master radio and the slave radio; and determining, at the slave radio, an allowable transmission power for the slave radio based at least in part on the information, wherein:

a sum of the allowable transmission power for the slave radio and the transmission power of the master radio does not exceed a total transmission power limit, and the allowable transmission power for the slave radio is determined based at least in part on an integer number N of distinct time instances that the instantaneous transmission power values of the master radio exceeds a transmission power threshold over the period of time when N>1, wherein the direct interface:

is dedicated to communication between the master radio and the slave radio, and operates at a lower latency than communication interfaces between either the master radio or the slave radio and host processing circuitry of the wireless communication device.

20. The non-transitory computer readable storage medium of claim 19, wherein the master radio comprises a cellular radio, and wherein the slave radio comprises a wireless local area network (WLAN) radio.

* * * * *